Figure 1:
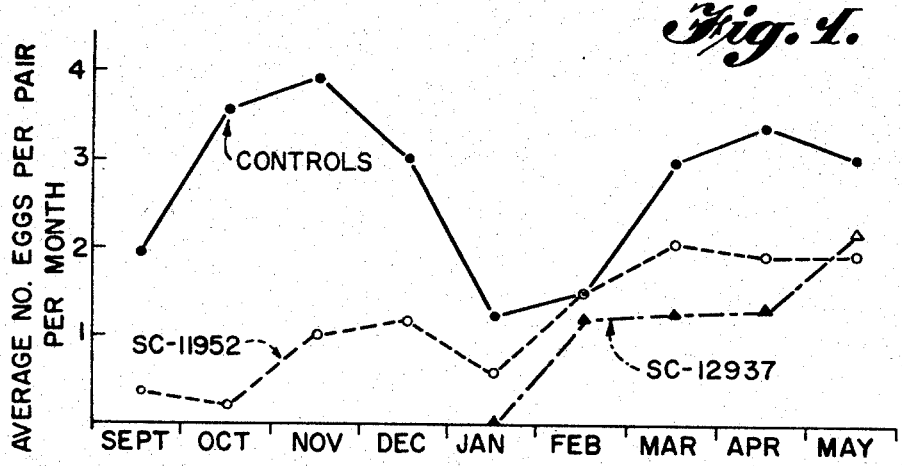

Dec. 31, 1968  W. H. ELDER  3,419,661

ORAL CONTRACEPTIVE FOR BIRDS

Filed Jan. 13, 1964

INVENTOR
WILLIAM H. ELDER

BY *Shoemaker and Mattare*

ATTORNEYS

United States Patent Office 3,419,661
Patented Dec. 31, 1968

3,419,661
ORAL CONTRACEPTIVE FOR BIRDS
William H. Elder, Columbia, Mo., assignor to The Curators of the University of Missouri, Columbia, Mo., a corporation of Missouri
Filed Jan. 13, 1964, Ser. No. 337,356
4 Claims. (Cl. 424—243)

This invention relates to a composition and a process for making same for decreasing reproduction in birds. More specifically, the invention is a new composition and process of administering a steroid compound as an oral contraceptive for birds both native and exotic or such compound mixed with a feed for the birds.

As man expands his numbers he comes in conflict with the few species of animals that are adaptable enough to thrive and even increase despite alteration of their environment or sometimes as a result of a new environment artificially created for them. The gradual spread of exotic birds such as the house sparrow (*Passer domesticus*), European starling (*Sturnus vulgaris*) and domestic pigeon (*Columbo livia*) obviously is the result of man's providing food and nesting sites. Each occasionally becomes so abundant as to require control.

This recent increase in the numbers of several species of native blackbirds as well as the increasing concern over the numbers of such exotic birds as starlings, house sparrows and pigeons has prompted widespread study of control methods. The use of poisons to eliminate nuisance birds has many repugnant if not hazardous aspects, particularly in cities. The use of a multitude of frightening devices, function only to move bird concentration from one building to another.

A more effective and less hazardous approach to this problem is to find one way to limit or control the reproduction of these birds. It was found that an ideal solution to this problem would be an oral contraceptive which would render sterile or impotent the male birds or inhibit ovulution in the female birds or both. In the past, most substances found effective in inhibiting ovulution in other animals have shown little effect in birds, even in nearly lethal doses.

It is therefore an object of the invention to provide a humane means of controlling the reproduction of birds.

Another object of the invention is to provide an oral contraceptive for birds which will cause sterility in male birds and inhibit ovulution in female birds.

A further object of the invention is to provide an oral contraceptive which may be incorporated in conventional bird feeds and which is effective yet not harmful to the birds or other animals.

A still further object of the invention is to provide a means of administering an oral contraceptive to provide a means of administering an oral contraceptive to birds by coating the feed of the birds with hte compound in liquid form.

Yet another object of the invention is to provide a means of administering an oral contraceptive to birds by agglomerating the compound with a suitable binder and mixing it with the bird feed.

Figure 2:
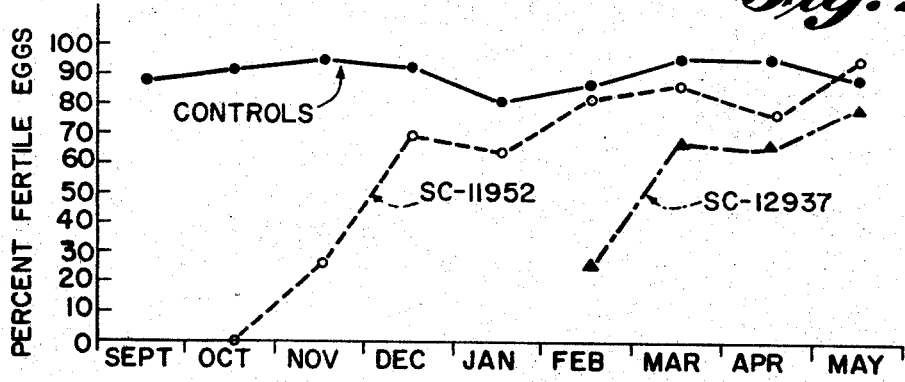
Figure 3:
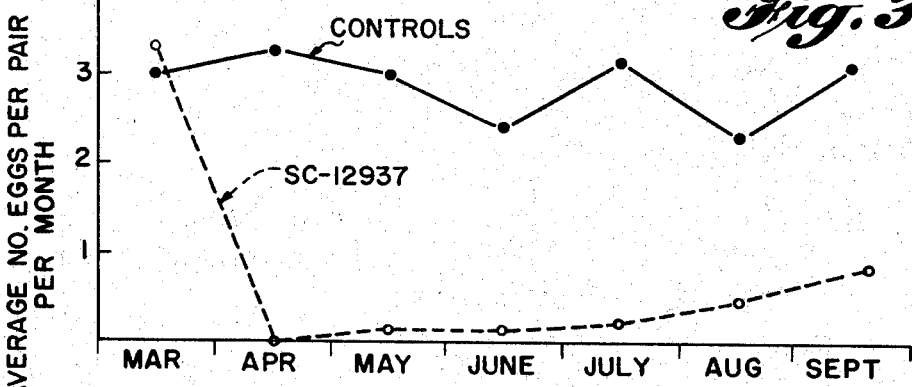

Other objects and advantages of the invention will become more apparent from the following detailed description and drawings, wherein:

FIGS. 1 and 3 are graphs showing the average number of eggs per pair per month; and FIG. 2 shows the percent fertile eggs.

I have found that certain hypocholesterolemic agents interfere with egg yolk formation. Not only do hypocholesterolemic agents inhibit ovulution in the female bird but also cause the male to become sterile. These agents shunt smaller molecular weight precursors of cholesterol into normal excretory pathways so there is no build-up in the liver. It seems likely that too little cholesterol is synthesized to allow an ovum to grow to the size necessary for ovulution to occur.

The hypocholoesterolemic agents I have found to be effective in small dosages are the following:

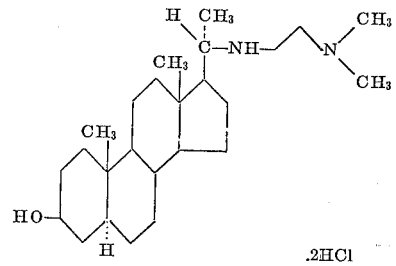

22,25-diazacholestanol dihydrochloride (20a-(A-dimethyl aminoethyl)-amino-5a-pregnan-3B-ol-dihydrochloride)

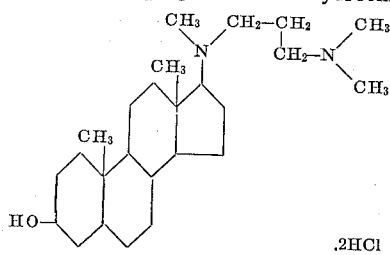

20,25 - diazacholoestenol dihydrochloride (N-methyl-N-(3-dimethyl amino) propyl-17B-aminoandrost-5-en-3B-ol-dihydrochloride)

Of the above compounds, 20,25-diazacholoestenol dihydrochloride was found to be the most active. With the less potent analog 22,25-diazacholoestanol dihydrochloride no viable egg was layed for 3 months following cessation of its feeding and normal fecundity and fertility were not restored for 5 months as shown in Table I and FIG. 1. With the analog rated as more potent 20,25-diazacholesternol dihydrochloride, there was complete inhibition of ovulution for three months following cessation of fall treatment and full fecundity and fertility were not restored for six months.

The hypercholesterolemic agents are prepared for administering to the birds by dissolving them in a solvent in which the feed is soaked and/or coating them on ordinary bird feed in the proper dosage levels.

The most effective dosage rate without having harmful side effects is from 0.05% to 0.3% by dry weight of the feed before coating. The preferred dosage is 0.1% of the feed before coating.

The said hypocholesterolemic agents can be dissolved in alcohol or water. The water is tasteless. The alcohol is a good wetting agent which besides being cheap does not cause pellets to swell and break up in mixing and is easily evaporated. For example, for 10 kilograms of feed 0.1% or 10 grams of 20,25-diazacholestenol dihydhochloride is dissolved in 100 cc. of ethyl alcohol and applied to the feed. The feed is coated in any suitable manner such as by spraying, by soaking the feed in the solvent, or by dipping in the solvent, etc. It is also possible to form pellets of the steroid with a binder either alone or with feed incorporated therein and feeding these pellets to the birds.

The most probable feeds used as mixes or carriers for the steroid are corn, cracked and whole, wheat, barley, oats, meat scraps, fish scraps, dog food and poultry mash pelleted.

The anti-fertility compound provided herein has proven effective on common pigeons (*Columbo livia*), European starlings (*Sturnus vulgaris*), house (English) sparrows (*Passer domesticus*), herring gull (*Larus argentatus*), California gull (*Larus californicus*), and black-billed magpie (*Pica pica*).

22,25-diazacholestanol dihydrochloride has been found to reduce cholesterol in normal and hypercholesterolemic rats, dogs and human patients. It shunts smaller molecular weight precursors of cholesterol into normal excretory pathways so there is no buildup in the liver. Both 22.25-diazacholestanol and 20,25-diazacholestenol dihydrochloride were tested in the diets of pigeons. While a 0.01% dosage of the latter reduced broodiness, no inhibition of ovulation occurred until the 0.1% level was used with each compound. Both seem very effective inhibitors of ovulation. The results of these tests are shown in Table I below:

the ten treated males outcrossed to normal females remained sterile although copulations were observed for at least 90 days. In practical field application, three treatments per year would give nearly complete control of reproduction.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A method of reducing fertility in birds comprising

TABLE I.—THE EFFECT OF HYPOCHOLESTEROLEMIC AGENTS ON THE FECUNDITY AND FERTILITY OF PIGEONS

| Dose [1] | Test Dates | Days | No. of Pairs | Average Food Consumption, g./p./d.[2] |
|---|---|---|---|---|
| 22,25-diazacholestanol dihydrochloride in ethyl alcohol 95%: | | | | |
| 0.1[3] | August 17 to September 1, 1962 | 15 | 10 | 67 |
| 20,25-diazacholestenol dihydrochloride in ethyl alcohol 95%: | | | | |
| 0.01[4] | October 11 to 30, 1962 | 20 | 10 | 60 |
| 0.1[4] | October 31 to November 15, 1962 | 16 | 10 | 75 |
| 0.1[5] | March 20 to April 4, 1963 | 15 | 20 | 80 |

[1] Dose is given in percentage of the diet by weight.
[2] Food consumption expressed as average number of grams eaten per pair per day.
[3] Results: 3 pairs immediately inhibited, other 7 layed one clutch each 4–9 days after feeding began. None resumed normal laying again for 3 months, 4 birds layed one or more infertile, anomalous or rotten eggs.
[4] Results: All layed 1–2 fertile clutches while on low dose but none sat for more than 3 days. On high dose only 3 layed, only one egg fertile, none layed again after Nov. 11 for 83 days or more. 2 died; 2 weak but recovered.
[5] Results: Complete inhibition of ovulation for 60 days (except for one egg, fertile).

As previously stated both analogs rendered pigeons anovulatory or without fertile eggs for three months and normal fecundity and fertility were not restored for five to six months. With both compounds, laying and fertility were very gradually resumed over a period of several months. First eggs were usually small, infertile and with very small yolks. One female having received 22,25-diazacholestanol dihydrochloride and two that received 20,25-diazacholestenol dihydrochloride never laid again.

In a further test, 30 pairs of birds were divided randomly into three groups. One group of ten pairs of birds was maintained as controls to follow normal fertility and fecundity through the summer, while the other 20 pairs were given a diet of 0.1% 20,25-diazacholestenol dihydrochloride for 15 days. Half were then maintained to observe the rate of return to normal and in the other 10 pairs the sexes were separated by exchanging the males with males from normal pairs previously proven fertile. The purpose of the exchange was to learn whether the sterility effects were due to the influence of the drug on the male or female or both.

In the three months following cessation of the diet, only five eggs were laid by the 20 treated females and only three of these were fertile (FIG. 3). Regardless of the presence of normal untreated males, the females remained essentially sterile for at least 90 days. Seven of administering orally a hypocholesterolemic compound selected from the group consisting of 22,25-diazachloestanol dihydrochloride and 20,25-diazacholestenol dihydrochloride to the birds in an amount necessary to reduce fertility.

2. The method of claim 1 wherein the hypocholesterolemic compound is agglomerated with a binder.

3. The method of claim 1 wherein the hypocholesterolemic compound is administered to the birds in their feed.

4. The method of claim 3 wherein the feed is coated with the hypocholesterolemic compound.

References Cited

UNITED STATES PATENTS

| 3,013,008 | 12/1961 | Counsell | 260—239.5 |
| 3,084,156 | 4/1963 | Counsell | 260—239.5 |
| 3,124,510 | 3/1964 | Rosenberg | 167—81 |
| 3,005,753 | 10/1961 | Vierling | 167—53 |

OTHER REFERENCES

Counsell et al.: J. Med. & Pharm. Chem., vol. 5, No. 6, November 1962, pp. 1224–1227.

ALBERT T. MEYERS, *Primary Examiner.*

V. C. CLARKE, *Assistant Examiner.*